United States Patent
Ito et al.

(10) Patent No.: US 12,511,825 B2
(45) Date of Patent: Dec. 30, 2025

(54) INFORMATION PROCESSING DEVICE, INFORMATION PROCESSING METHOD, AND A NON-TRANSITORY COMPUTER-READABLE STORAGE MEDIUM

(71) Applicant: ZOZO, Inc., Chiba (JP)

(72) Inventors: Masahiro Ito, Chiba (JP); Goffinet Francois, Auckland (NZ); Heather Jamie, Auckland (NZ); Li Bo, Auckland (NZ); Gardner Jim, Auckland (NZ); Villamarin Rigo, Chiba (JP)

(73) Assignee: ZOZO, Inc., Chiba (JP)

( * ) Notice: Subject to any disclaimer, the term of this patent is extended or adjusted under 35 U.S.C. 154(b) by 140 days.

(21) Appl. No.: 18/280,635

(22) PCT Filed: Mar. 9, 2021

(86) PCT No.: PCT/JP2021/009350
§ 371 (c)(1),
(2) Date: Sep. 6, 2023

(87) PCT Pub. No.: WO2022/190217
PCT Pub. Date: Sep. 15, 2022

(65) Prior Publication Data
US 2024/0153204 A1 May 9, 2024

(51) Int. Cl.
*G06T 17/00* (2006.01)
*G06V 10/762* (2022.01)
*G06V 10/764* (2022.01)

(52) U.S. Cl.
CPC ............ *G06T 17/00* (2013.01); *G06V 10/762* (2022.01); *G06V 10/764* (2022.01)

(58) Field of Classification Search
None
See application file for complete search history.

(56) References Cited

U.S. PATENT DOCUMENTS

D869,966 S    12/2019  Maezawa
D871,935 S    1/2020   Maezawa
(Continued)

FOREIGN PATENT DOCUMENTS

CA    3095732 A1    10/2019
EP    3779879 A1    2/2021
(Continued)

OTHER PUBLICATIONS

English Translation of WO/2019/189846 (Year: 2019).*
(Continued)

*Primary Examiner* — Peter Hoang
(74) *Attorney, Agent, or Firm* — Rimon P.C.

(57) ABSTRACT

An information processing device includes: a formation unit configured to analyze relative positions of dots as measurement markers that expand and contract together with a suit, and form a cluster of the dots; an assignment unit configured to assign numbers to the cluster and the dots; a specification unit configured to acquire the assigned number, set the assigned number to a predetermined coordinate position, and specify a silhouette; and a generation unit configured to generate a three-dimensional (3D) model based on the specified silhouette. The formation unit forms a hexagonal cluster from a dot pattern of the suit, and increases the hexagonal cluster to form a unique honeycomb structure. The assignment unit assigns numbers to the cluster and the dots based on the honeycomb structure. Solid dots and hollow dots are printed as the dots on the whole suit. Thus, a 3D model of a body shape of a user is created with higher accuracy by using a garment for measuring body sizes.

11 Claims, 6 Drawing Sheets

(56) References Cited

U.S. PATENT DOCUMENTS

| | | |
|---|---|---|
| 2004/0227752 A1 | 11/2004 | McCartha et al. |
| 2007/0206832 A1 | 9/2007 | Gordon et al. |
| 2010/0214284 A1* | 8/2010 | Rieffel .................. G06T 17/00 382/154 |
| 2012/0095589 A1 | 4/2012 | Vapnik |
| 2014/0070016 A1 | 3/2014 | Butler et al. |
| 2019/0208177 A1 | 7/2019 | Koyama et al. |
| 2020/0367590 A1 | 11/2020 | Istook et al. |

FOREIGN PATENT DOCUMENTS

| | | |
|---|---|---|
| JP | 2003-269936 A | 9/2003 |
| JP | 2009-508193 A | 2/2009 |
| JP | 1619661 S | 12/2018 |
| JP | 1619759 S | 12/2018 |
| JP | 1619761 S | 12/2018 |
| JP | 1619762 S | 12/2018 |
| JP | 2020-166652 A | 10/2020 |
| TW | 201401222 A | 1/2014 |
| WO | 2018/047687 A1 | 3/2018 |
| WO | 2019/189846 A1 | 10/2019 |

OTHER PUBLICATIONS

International Search Report issued in corresponding International Patent Application No. PCT/JP2021/009350, dated May 25, 2021, with English translation.

Japanese Notification of Reasons for Refusal issued in corresponding Japanese Application No. 2022-517318, dated Jun. 14, 2022, with English translation.

Japanese Decision to Grant a Patent issued in corresponding Japanese Application No. 2022-517318, dated Oct. 18, 2022, with English translation.

Taiwanese Letter of Notice of Examiner's Opinions issued in corresponding Taiwanese App. No. 111108248, dated Jan. 6, 2023, with English translation.

Mutsumi Somehara et al., "Rakuten and Itochu Join the Battle: Down with zozo! E-commerce Megacompetition," ikkei Computer, May 24, 2018, No. 965, ISSN 0285-4619, 11 pages, with English translation of relevant part.

European Extended Search Report for corresponding European Application No. 21930074.6 issued on Nov. 27, 2024.

Office Action for corresponding Canadian Application No. 3,212,839 issued on Nov. 28, 2024.

Zozo launches Zozosuit 2, a 3D body measurement suit, and opens its measurement technologies, Zozosuit 2 and the Zozomat for business partnership. Zozo, Inc. (Oct. 29, 2020). https://corp.zozo.com/en/news/20201029-19365/.

Office Action issued in corresponding Chinese Patent Application No. 202180095356.6, dated May 26, 2025.

Office Action dated Mar. 22, 2025, from corresponding Indian Patent Application No. 202347059783, 9 pages.

Lee et al. "Parametrized garment pattern manipulation for the men's suit", ICDSP 2019, Feb. 24-26, 2019, Jeju Island, Republic of Korea, DOI: https://doi.org/10.1145/3316551.3316575.

Scott et al. "Landmarking and measuring for critical body shape analysis targeting garment fit", Proceedings of 3Dbody.tech 2018, 9th Int. Conference and Exhibition on 3D Body Scanning and Processing Technologies, Lugano, Switzerland, Oct. 16-17, 2018, DOI: 10.15221/18.222 http://dx.doi.org/10.15221/18.222.

Mccartney et al. "An energy-based flattening technique for woven fabrics", Journal of The Textile Institute, 95:1-6, 217-228 (2004).

Office Action dated Sep. 4, 2025, from corresponding Canadian Patent Application No. 3,212,839, 4 pages.

* cited by examiner

FIG.3

| | OLD MODEL BODY SUIT FS | NEW MODEL BODY SUIT ZS |
|---|---|---|
| MARKER | 400 TO 500 MARKERS OF FIXED SIZE ARE SPARSELY DISTRIBUTED ON WHOLE SUIT | 20,000 TO 40,000 ELASTIC CIRCULAR DOTS DENSELY COVER SURFACE OF SUIT (BODY SHAPE CAN BE REPRESENTED MORE CLEARLY ESPECIALLY AT PORTION HAVING HIGH CURVATURE) |
| ENCODING | EACH MARKER INCLUDES SERIES OF SMALL CIRCULAR DOTS FOR ENCODING IDENTIFIERS FROM 1 TO 512 | EACH DOT IS SOLID OR HOLLOW CIRCLE. DOT IS UNIQUELY IDENTIFIED BY ANALYZING LOCAL POSITION OF DOT, AND FINDING MATCHING WITH LARGER PSEUDO-RANDOM PATTERN |
| SCALE REFERENCE STANDARD | ALL MARKERS HAVE KNOWN DIAMETER OF 20 mm (±0.5 mm, CONSIDERING MISMATCHING IN MANUFACTURING) | SOME MARKERS OF FIXED SIZE (WITH LOGOTYPE) ARE ATTACHED TO IMPORTANT POSITIONS (CHEST, BACK, AND LEGS) OF GARMENT |
| MANUFACTURE | MANUFACTURED BY USING SPECIAL LOW-ELASTIC INK, AND USING CUSTOMIZED EXPENSIVE SCREEN PRINTING METHOD | MANUFACTURED BY USING STANDARD MANUFACTURING METHOD THAT IS LOW-COST, FAST, AND CLEAN (SUCH AS STANDARD SCREEN PRINTING, DIGITAL PRINTING, AND THE LIKE). ALSO USED IS SCALE MARKER THAT CAN BE MANUALLY ATTACHED BY USING HEAT TRANSMISSION |
| IMAGE PROCESSING | ALGORITHM FOR DETECTING AND IDENTIFYING REFERENCE MARKER IN IMAGE | ALGORITHM FOR DETECTING, CLASSIFYING, AND IDENTIFYING CLUSTER OF DOTS IN IMAGE |
| BODY MODEL | ESTIMATE BODY SHAPE BY USING ORIGINAL PCA BODY MODEL (FOR GIVING ONLY BASIC SUPPORT FOR MOTION OF HANDS AND FEET) | ESTIMATION OF BODY SHAPE AND DYNAMIC REARRANGEMENT OF MODEL ARE ENABLED BY COMMERCIAL ARTICULATED BODY MODEL (SMPL) |
| MEASUREMENT ACCURACY | AVERAGE SURFACE MEASUREMENT ERROR IS EQUAL TO OR SMALLER THAN 7 mm | AVERAGE SURFACE MEASUREMENT ERROR IS EQUAL TO OR SMALLER THAN 4 mm |

INFORMATION PROCESSING DEVICE, INFORMATION PROCESSING METHOD, AND A NON-TRANSITORY COMPUTER-READABLE STORAGE MEDIUM

CROSS-REFERENCE OF RELATED APPLICATIONS

This application is the U.S. National Phase under 35 U.S.C. § 371 of International Patent Application No. PCT/JP2021/009350, filed on Mar. 9, 2021, the entire disclosure of which Application is incorporated by reference herein.

FIELD

The present invention relates to an information processing device, an information processing method, and non-transitory computer-readable storage medium.

BACKGROUND

In the related art, there is disclosed a garment for measuring body sizes for measuring a body shape of a user.

CITATION LIST

Patent Literature

Patent Literature 1: Japanese design registration No. 1619661
Patent Literature 2: Japanese design registration No. 1619759
Patent Literature 3: Japanese design registration No. 1619761
Patent Literature 4: Japanese design registration No. 1619762

SUMMARY

Technical Problem

However, the related art described above is under development in view of technology, and there is room for further development and improvement. The garment for measuring body sizes is used for creating an accurate 3D model indicating measurement values of a body (a waistline, a hip line, and the like) in accordance with the body shape of the user. Thus, there has been a demand for a technique for creating the 3D model of the body shape of the user with higher accuracy by using the garment for measuring body sizes.

The present application has been made in view of such a situation, and aims at creating the 3D model of the body shape of the user with higher accuracy.

Advantageous Effects of Invention

According to an aspect of an embodiment, the 3D model of the body shape of the user can be created with higher accuracy.

BRIEF DESCRIPTION OF DRAWINGS

FIG. 3 is a diagram illustrating a comparative table of the old model body suit and the new model body suit.

DESCRIPTION OF EMBODIMENTS

Figure 1:
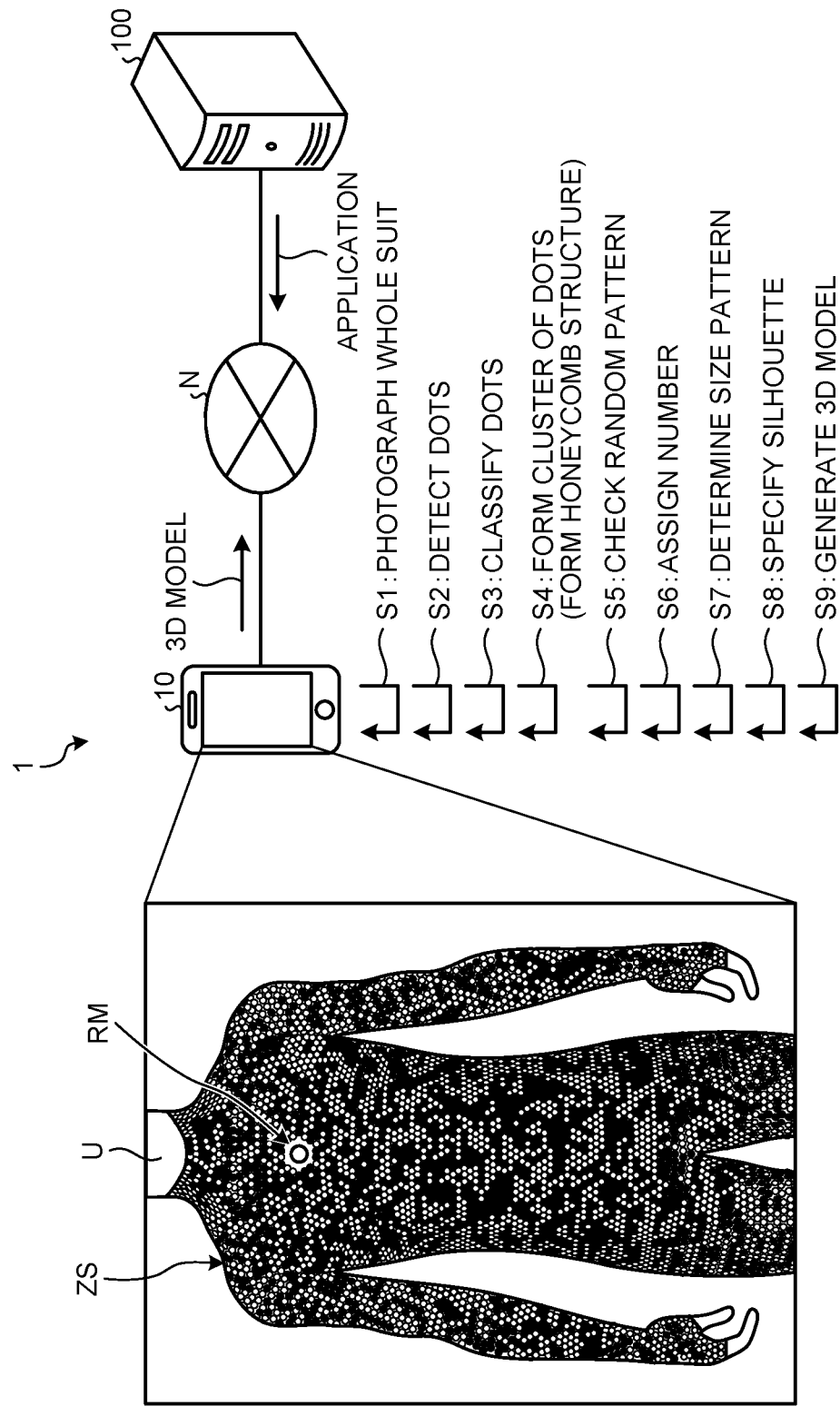
FIG. 1 is an explanatory diagram illustrating an outline of a body size measuring method according to an embodiment.

The following describes a mode for implementing an information processing device, an information processing method, and an information processing program according to the present application (hereinafter, referred to as an "embodiment") in detail with reference to the drawings. The information processing device, the information processing method, and the information processing program according to the present application are not limited to the embodiment. In the following embodiment, the same portion is denoted by the same reference numeral, and redundant description will not be repeated.

1. Outline of Body Size Measuring Method

First, the following describes an outline of a body size measuring method performed by the information processing device according to the embodiment with reference to FIG. 1. FIG. 1 is an explanatory diagram illustrating the outline of the body size measuring method according to the embodiment. Regarding FIG. 1, described is an example of a case of creating a three-dimensional morel (3D model) of a body of a user by measuring a body shape of the user wearing a garment for measuring body sizes.

Information Processing System 1

An information processing system 1 according to the present embodiment creates an accurate 3D body model indicating measurement values of the body (a waistline, a hip line, and the like) in accordance with the body shape of the user wearing a body suit as the garment for measuring body sizes. The 3D body model can be adapted to various purposes of use such as fitting of apparel, tracking of effects of a diet/fitness regimen, or training of a machine learning/Artificial Intelligence (AI) system. In the following description, the 3D body model may be simply referred to as a 3D model in some cases.

The information processing system 1 according to the present embodiment is comprised of "hardware" (a stretch body suit+a smartphone) and "software" (an application started on a terminal, server software/Web site). The following describes these elements in detail.

As illustrated in FIG. 1, the information processing system 1 includes a terminal device 10, an information providing device 100, and a new model body suit ZS. The terminal device 10 and the information providing device 100 are connected to be able to communicate with each other in a wired or wireless manner via a network N. The network N is, for example, a local area network (LAN) or a wide area network (WAN) such as the Internet. The terminal device 10 can be connected to the network N via a wireless communication network such as Long Term Evolution (LTE), 4th Generation (4G), or a fifth-generation mobile communication system (5th Generation: 5G), or near-field wireless communication such as Bluetooth (registered trademark) or a wireless local area network (LAN) to communicate with the information providing device 100.

The number of devices included in the information processing system 1 illustrated in FIG. 1 is not limited to the number in the drawing. For example, FIG. 1 illustrates the only one terminal device 10 for simplifying the drawing, but this is exemplary only. The embodiment is not limited thereto, and two or more terminal devices 10 may be used. In the following description, the new model body suit ZS may be simply referred to as a "suit" in some cases. That is, the suit indicates the new model body suit ZS unless specifically noted otherwise.

Information Providing Device 100

The information providing device 100 is an information processing device that provides an API service and the like for various applications and the like, and various kinds of data to the terminal device 10 of a user U in cooperation with the terminal device 10 of the user U, and is implemented by a server device, a cloud system, and the like. In the present embodiment, the information providing device 100 provides an application for measuring body sizes to the terminal device 10, and receives a 3D body model generated by using the application from the terminal device 10. The information providing device 100 then uses the 3D body model for various purposes, or provides the 3D body model to various terminal devices or server devices.

Terminal Device 10

The terminal device 10 is a smart device such as a smartphone or a tablet used by the user U, and is a portable terminal device that can communicate with an optional server device via a wireless communication network such as 4G (Generation) or Long Term Evolution (LTE). The terminal device 10 has a screen such as a liquid crystal display having a function of a touch panel, and receives various operations for display data such as content from the user, the operations such as a tap operation, a slide operation, and a scroll operation by a finger, a stylus, and the like. An operation performed in a region in which the content is displayed on the screen may be assumed to be the operation for the content. The terminal device 10 is not limited to a smart device, but may be an information processing device such as a desktop personal computer (PC) or a notebook PC.

In the present embodiment, a smartphone is exemplified as the terminal device 10. There is no special requirement for the smartphone except the condition that a camera (imaging device) of reasonable quality is mounted thereon. That is, it is sufficient that the smartphone includes a camera of general quality, and the smartphone is not required to be the latest model including a high-resolution camera, a depth sensor, and the like.

In a case in which the user U performs 3D scan on his/her body using the new model body suit ZS as the garment for measuring body sizes, the user U installs an application for measuring body sizes in the terminal device 10, starts the application, places the terminal device 10 on a stand, stands in front of the terminal device 10 in a state of wearing the new model body suit ZS, and captures a series of images while slowly rotating his/her body. When a sufficient number of images (twelve images, normally) are collected, the application processes the images, and constructs a 3D "mesh" representing the size and shape of the body of the user U.

New Model Body Suit ZS

The new model body suit ZS is a tight body suit having stretchiness and tightness that is manufactured by using a standard garment printing technique (digital sublimation printing) with low cost. The new model body suit ZS covers the whole body of a wearer (except a face and a head), and is comprised of two parts including leggings and a top. On the new model body suit ZS, there is a dot design pattern covering almost the entire portion of a surface thereof, and dots are arranged as dense regular hexagons (honeycomb shape). Each of the dots is any of "solid" and "hollow", which is selected by using a pseudo-random algorithm. A hollow dot has an O-shape (doughnut shape). For example, almost the same number of solid dots and hollow dots are printed on the whole suit by specifications. By analyzing the dot pattern of an optional portion of the new model body suit ZS, a portion of the garment that is being seen can be estimated.

Figure 2:
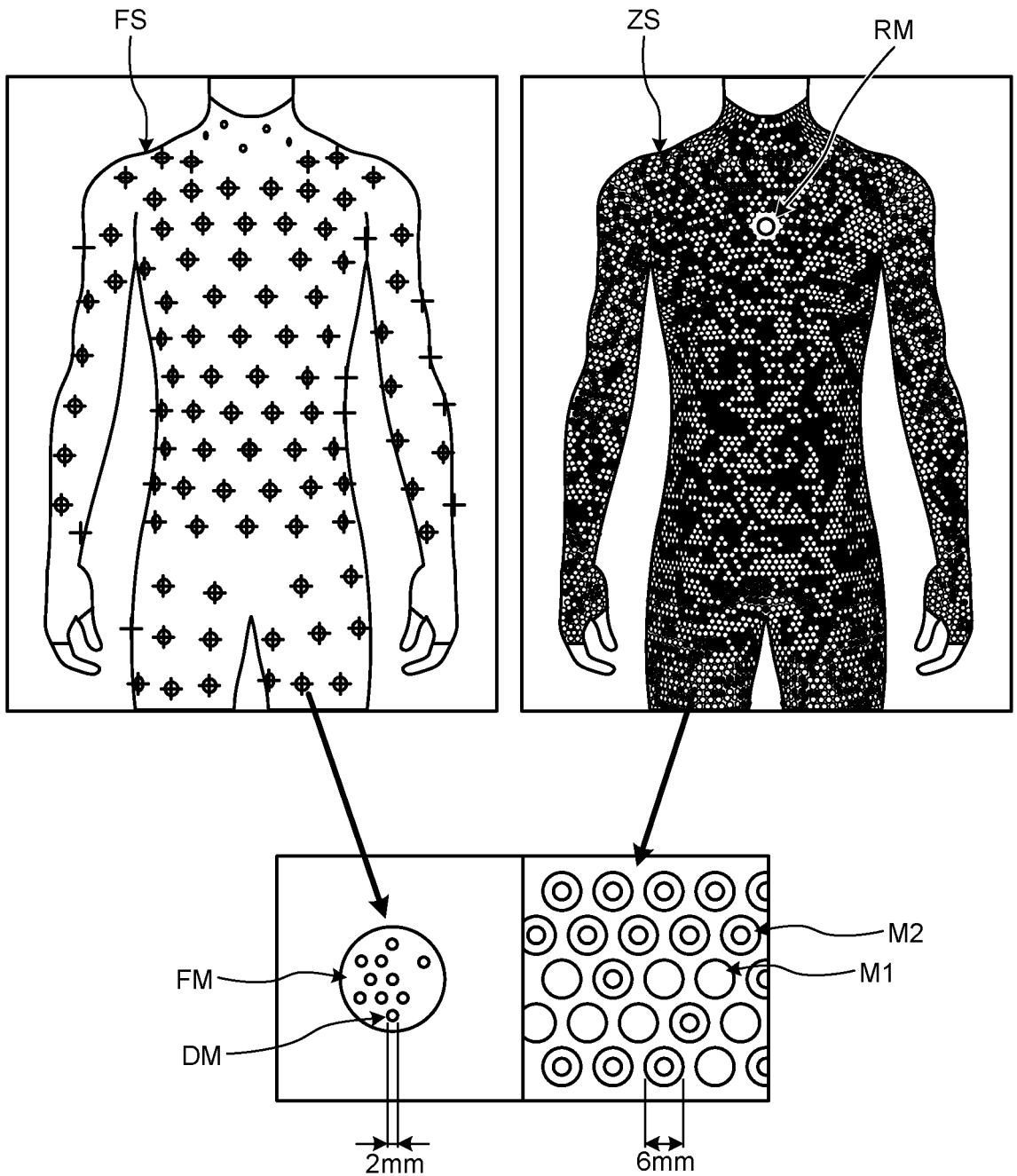
FIG. 2 is a diagram illustrating an example of an old model body suit and a new model body suit.

With reference to FIG. 2, the following describes a characteristic of the new model body suit ZS as compared with an old model body suit FS as a conventional product. FIG. 2 is a diagram illustrating an example of the old model body suit FS and the new model body suit ZS.

As illustrated in FIG. 2, in the old model body suit FS, a recognition target is an old model marker FM each having a size of about several centimeters (a plurality of dots DM of 2 mm are disposed thereon), but in the new model body suit ZS, the recognition target is new model markers M1 and M2 each having a size of 6 mm. Each of the new model markers M1 and M2 also serves as a dot. That is, the new model markers M1 and M2 themselves are dots. Herein, the new model marker M1 is a "solid" dot, and the new model marker M2 is a "hollow" dot. Thus, recognition performance is improved, and the camera of the smartphone is enabled to capture more pieces of marker information. The sizes described above are merely examples. Actually, the dot and the hollow may have an optional size.

In measurement using the old model body suit FS, about 400 markers are recognition targets. However, in measurement using the new model body suit ZS, about 20,000 markers can be recognition targets. That is, the new model body suit ZS includes the markers the number of which is about 50 times that of the old model body suit FS, and measurement/analysis accuracy is largely improved. Thus, detailed body shape information can be read, and a more accurate 3D model can be generated.

Principal Design/Printing Requirement of Dot Design

The dots of the suit (the new model markers M1 and M2 of the new model body suit ZS) are required to be densely disposed as much as possible, but a sufficient margin is required around each of the dots so that the dots can be detected from a background color of the suit to be segmented when obliquely viewed and viewed from a distance through a lens of the camera. In a case of the "hollow" dot, a size of an inner frame portion of a circle needs to be clearly distinguished from the solid dot under an appearance condition described above. Additionally, it is important that contrast between a foreground color and a background color of each printed dot can be easily detected even in a case in which an illumination environment is bad.

The color of the dot and the background color are allowed to be flexibly selected. In the simplest case, the dot is white, and the background color of the suit is black. However, a wide variety of color specifications can be employed for variations such as a colored suit and colored dots, a plurality of background colors for the whole single suit, and the like. A more customized design can also be created by embedding a logotype or an image in the background of the suit.

Alternatively, a square or a hexagon can be used instead of the circular dot, or a color can be used for distinguishing between two types of dots or other geometric designs.

It is important that fabric of the new model body suit ZS has stretchiness and fits the body tightly, and the number of variations of required sizes can be suppressed to the minimum by using fabric that can be comfortably worn by almost all people in a fitted state. It is also important that the fabric has sufficient contrast to clearly recognize the dots even in a case of being highly stretched.

Reference Marker RM

Unlike the old model body suit FS on which the marker (old model marker FM) is printed by ink having no stretchiness, the markers (new model markers M1 and M2) of the new model body suit ZS have stretchiness, so that the suit itself can be manufactured more easily. However, the new model body suit ZS holds some non-stretch reference markers RM (known size) to have reference to a scale. The size of the reference marker RM is at least larger than that of the new model markers M1 and M2. In the present embodiment, the reference marker RM has the same size as that of the old model marker FM. These reference markers RM each have a white circular shape including a logotype at the center, and are attached to strategic portions (a bust, a back, and legs). In the present embodiment, the new model body suit ZS holds five reference markers RM in total, that is, one at the center of a chest, two around scapulae on a back (one on a right side, one on a left side), and two on outer sides of both knees of the legs (one on a right leg side, and one on a left leg side). Plastic having no stretchiness is used as material of the reference marker RM, and the reference marker RM is attached to the suit by using a heat press.

Body Model

In the present embodiment, a parametric model of a human body is assumed as a body model. For example, a commercially licensed Skinned Multi-Person Linear model (SMPL model) is used as the body model. Other parametric body models (original model or a model provided by a third party) can also be used. In principle, scanning of other objects such as Positron Emission Tomography (PET) can be performed, for example, so long as an appropriate body model can be used.

Image Processing

Basic input data for constructing the 3D model is a photograph (image) of the user U wearing the suit that is photographed at various viewing angles (including angles of view). In the present embodiment, twelve photographs are taken at various viewing angles. With an algorithm used herein, a person in the image can be detected by detecting and recognizing the dot pattern covering the suit. A face or eyes in the image can also be detected, as long as it is within a visible range.

The image is processed to recognize small circular/elliptical "blobs" that may be the dots of the suit (the new model markers M1 and M2 of the new model body suit ZS). Each of the detected dots are classified into "solid", "hollow", or "unknown". Relative positions of the dots that are detected in the vicinity of each local image are analyzed, and a "cluster" of the dots matching an expected honeycomb (regular hexagonal) pattern is formed.

Each cluster that has been formed is checked whether the cluster matches a known pseudo-random pattern used for printing the dots on the suit while considering rotational symmetry. Some clusters are rejected at this stage because the cluster is too small to acquire matching, or the cluster includes an invalid dot and cannot be recognized. In remaining clusters, a unique number (numerical identifier) is assigned to each dot for identifying the dot on the suit.

Processes of detecting and identifying the dots are applied to each image, and a set of pixel coordinates and a corresponding numerical identifier of each of the detected dots are acquired. The acquired data is input to the 3D fitting algorithm as the basic input data required for fitting of the 3D body model.

With the algorithm used herein, a silhouette (outline) of a person in the image can be specified in addition to the position of the dot by processing each photograph. However, the outline can be specified depending on the contrast between the suit and the background, so that the outline can be detected only for a pixel the silhouette of which is clearly displayed. The silhouette is potent input data for fitting the 3D model more clearly.

3D Fitting

With the 3D fitting algorithm, calculated is a set of the dots detected in each image frame, body model parameters accurately fitting to the position of the silhouette, and relative camera poses. Specifically, an object is to estimate (i) the 3D model of the body shape of the user U, (ii) the positions of the respective dots on the body, (iii) a position and orientation of the camera with respect to the body, and (iv) a pose of the body reflected in each image at the same time. As a method, a repetition procedure is used to minimize a pixel distance between an estimated position and an observed position of each dot in each image while adjusting all of the parameters (starting from the first estimation). In a case in which silhouettes are detected in one or a plurality of image frames, they are also subjected to minimization. A fitting process is configured by some continuous steps as described below.

(1) First Estimation

Starting from an average body shape, "default" positions of the respective dots on the body are assumed, and a try is made to find the set of relative camera poses matching the detected image data by the fitting algorithm. To accelerate convergence, additional information (if it is usable) is input to the algorithm, the additional information including distinction of sex of the user U, a height, a body weight, a pose of the user U (selected from corresponding poses), and the like.

(2) Point Cloud Fit

Starting from the first estimation, estimated values of 3D positions of the respective dots and the camera poses are repeatedly adjusted, and matching with the positions of the dots detected in each image frame is improved. This step is standard in computer vision, and is typically called "bundle adjustment". Next, parameters of the parametric body model (SMPL) are optimized, and a distance from each 3D dot position to a surface of the mesh is minimized to perform initial fit of the 3D body model.

(3) Body Fitting

Subsequently, the parameters of the parametric body model (SMPL) are further adjusted, and a distance between an estimated dot position and an observed dot position in each image is minimized. At this step, the dot can be moved on a surface of the body as needed. This is because, in a case in which variations are caused in a method of wearing the suit, the dot may be displayed at an unexpected place on the body when the fabric is locally twisted or stretched. Silhouette data is included in the fitting process at this stage. The fitting process is repetitive, and follows a processing strategy of "from coarse things to fine things". In this strategy, a subset of the most important model parameters is estimated first, and additional parameters are introduced as the algorithm proceeds. At the last step of the fitting, a "dynamic" change of the model, that is, movement of hands and feet between image frames is enabled.

A method of configuring these steps is flexible to some extent. Different configurations can be used depending on use. The three steps described above are implemented by using an original fast mathematics algorithm with which all pieces of the processing can be completed within about 30 seconds by the smartphone.

Application

In a "default" mode for scanning the user U, the smartphone as the terminal device 10 is placed on a stand made of corrugated cardboard, and a rear camera is turned toward the user U in a state in which the stand is placed on a flat desk. The stand described above may be provided to the user U as an accessory of the suit. Next, the user U stands in front of the terminal device 10, and guided to rotate his/her body at various angles while the photograph is taken. The user U is required to maintain a consistent pose of the body throughout the whole scanning, and to stop moving while each photograph is being taken. In a default scanning pose, legs are opened at a shoulder width in a state of standing upright, and arms are straightly held downward while keeping a short distance from hips. In addition to the default pose, a pose of raising arms for scanning and the like can be used.

The application provides a tutorial, a design drawing, an interactive check, and voice guidance for checking that the user U wears the suit properly, and guiding the user U to an optimum standing position before starting scanning. Additionally, an alternative scan mode is also implemented as described below.

(1) Photographing by Another Person

While the user U stands still, another person takes a photograph of the user U at various angles. This is what is called a "buddy mode", which is convenient for a case of scanning a child who does not understand a scan procedure.

(2) Continuous Rotation

To eliminate a need to stop moving at the time of taking a photograph by the user U, video capture is used instead of setting a static image.

(3) Flexibly Handling Motion

For example, a large motion of hands and feet between frames of an image is recognized.

In the terminal device 10, the 3D body model is created when scanning is completed, and the 3D body model is displayed on a screen for the user U. Alternatively, an error is presented to the user U if a problem is detected, and the user U is enabled to make a retry. The measurement values (a hip size, a waist size, lengths of legs, and the like) of the body of the user U are calculated from the 3D model, and displayed as a measurement result for the user U.

Transmission to Server

When scanning is successfully performed, the terminal device 10 uploads the 3D body model to the information providing device 100 as a main server. Thus, the information providing device 100 is enabled to use the uploaded 3D body model in various situations such as fitting of a garment, or tracking of the body shape with a lapse of time.

A fast processing time of the algorithm is one of excellent functions of the information processing system 1. An image is not required to be uploaded to a server due to batch processing, and the whole processing can be locally completed on a terminal (the terminal device 10). For example, processing is completed in about 30 seconds depending on the terminal device 10. Thus this function, there is no need to wait until the image is completely uploaded, and to store an individual image via the Internet, so that it is also advantageous for the user.

However, in some cases, it is preferable to perform the processing on the server (information providing device 100). For example, the cases include a case of supporting the terminal device 10 including an OS the operation speed of which is very slow, a case of executing the information processing system on a Web browser instead of a dedicated application, and the like. The algorithm and an UX function according to the present embodiment also support processing on the server (information providing device 100). That is, the processing of measuring the body size and generating the 3D model described above is not necessarily performed on the terminal (terminal device 10), and may be performed on the server (information providing device 100). In this case, the application described above can be read as server software.

1-1. Comparison Between New Model and Old Model

Next, the following describes a specific difference between the old model body suit FS and the new model body suit ZS with reference to FIG. 3. FIG. 3 is a diagram illustrating a comparative table of the old model body suit FS and the new model body suit ZS.

Marker

The old model body suit FS includes 400 to 500 markers of a fixed size that are sparsely distributed on the whole suit. On the other hand, the new model body suit ZS includes 20,000 to 40,000 circular dots having stretchiness that densely cover the surface of the suit. Thus, the body shape can be represented more clearly especially at a portion having a high curvature.

Encoding

Each of the markers (old model marker FM) of the old model body suit FS includes a series of small circular dots DT for encoding identifiers from 1 to 512. On the other hand, each of the dots (new model markers M1 and M2) of the new model body suit ZS has a solid or hollow circular shape. The dot is uniquely identified by analyzing a local position of the dot, and finding matching with a larger pseudo-random pattern.

Scale Reference Standard

In the old model body suit FS, all of the markers (old model markers FM) are fixed markers FM having a diameter of 20 mm (plus or minus 0.5 mm) as a known size. On the other hand, in the new model body suit ZS, some fixed markers with a logotype (reference markers RM) having a known size are attached to important positions (a chest, a back, and legs) of the garment separately from the new model markers M1 and M2 that have stretchiness.

Manufacturing

The old model body suit FS is manufactured by using special low-stretch ink, and using a customized expensive screen printing method. On the other hand, for the new model body suit ZS, used is a standard manufacturing method that is low-cost, fast, and clean (such as standard screen printing, digital printing, and the like). Also used is a scale marker that can be manually attached by using heat transmission.

Image Processing

The old model body suit FS uses an algorithm for detecting and identifying any of the old model markers FM to be a reference marker in the image. On the other hand, the new model body suit ZS uses an algorithm for detecting, classifying, and identifying a cluster of the dots (new model markers M1 and M2) in the image.

Body Model

The old model body suit FS uses an original PCA body model (for giving only basic support for motion of hands and feet) to estimate the body shape. On the other hand, the new model body suit ZS enables estimation of the body shape and dynamic rearrangement of the model by an articulated commercial body model (SMPL).

Measurement Accuracy

With the old model body suit FS, an average surface measurement error is equal to or smaller than 7 mm. On the other hand, with the new model body suit ZS, an average surface measurement error is equal to or smaller than 4 mm.

1-2. Other Characteristic Points

The following describes other characteristic points of the new model body suit ZS.

(1) Disposition of Fixed Markers

There has been the problem that a reference scale for measurement cannot be acquired because the new model markers M1 and M2 as stretch measurement markers expand and contract as the suit expands and contracts. The problem has been solved by disposing a predetermined number of the reference markers RM as non-stretch fixed markers at predetermined positions as fixed points to specify a scale size.

The predetermined positions and number are positions (a chest, a back, and feet) and a number (four or more) where the fixed marker is necessarily included at the time of photographing at respective viewing angles for photographing the whole body without lowering measurement accuracy. That is, the predetermined positions and number are positions and a number necessarily including the fixed marker when the whole suit is photographed at any angle.

By disposing a stretch material area around the reference marker RM as the fixed marker, the fixed marker suitable for the new model body suit ZS has been implemented.

(2) Dot Detection Method

The terminal device 10 forms the cluster of the dots to be adapted to the honeycomb pattern by analyzing relative positions of the dots. For example, the terminal device 10 forms a hexagonal cluster from the dot pattern, and increases the hexagonal cluster to form a unique honeycomb structure. Numbers are distributed to the clusters and the dots based on the honeycomb structure. At this point, the terminal device 10 checks whether a random pattern of the dots of each cluster matches a known random pattern (pattern matching). In checking the random pattern, the terminal device 10 classifies each of the dots into a predetermined dot. For example, each of the dots is classified into any of solid, hollow, and unknown (unspecifiable).

The terminal device 10 acquires an assigned number, sets the assigned number to a predetermined coordinate position, and specifies a silhouette (outline). The terminal device 10 then generates 3D model shape data of the body based on predetermined body parameter+camera pose set data that is set in advance for the specified silhouette, and enables the body size to be measured from the generated shape data.

(3) Suit Size Pattern Determination

A plurality of size patterns (predetermined number of patterns) of the suit are prepared in advance, and an optional size pattern is selected in accordance with the body of the user. For example, as the size patterns, suits of S size (small), M size (medium), L size (large), and the like may be prepared. In measurement, a measurement algorithm is provided every size patterns, the size pattern is determined based on analysis of the honeycomb structure described above at the time of photographing the suit, and a measurement algorithm corresponding to the size pattern is applied.

1-3. Basic Operation

Based on the above description, the following describes a basic operation of the body size measuring method performed by the information processing device according to the embodiment.

As illustrated in FIG. 1, the terminal device 10 starts the application, and photographs the whole body of the user U wearing the new model body suit ZS (the whole suit) at various viewing angles (including angles of view) by the camera function (Step S1). In the present embodiment, a plurality of size patterns (predetermined number of patterns) of the suits are prepared in advance, and an optional size pattern is selected in accordance with the body of the user U. The terminal device 10 takes twelve photographs at various viewing angles. At the time of photographing the whole body at each viewing angle, the fixed marker (reference marker RM) is necessarily included in the each photograph.

Subsequently, the terminal device 10 detects small circular/elliptical "blobs" that may be the dots of the suit (the new model markers M1 and M2 of the new model body suit ZS) from the photographed image (Step S2).

Subsequently, the terminal device 10 classifies each of the detected dots into any of "solid", "hollow", and "unknown" (Step S3).

Subsequently, the terminal device 10 forms the "cluster" of the dots to be adapted to an expected honeycomb (regular hexagonal) pattern by analyzing relative positions of the detected dots (Step S4). For example, the terminal device 10 forms a hexagonal cluster from the dot pattern, and increases the hexagonal cluster to form a unique honeycomb structure.

Subsequently, the terminal device 10 checks whether the formed cluster matches the known pseudo-random pattern used for printing the dots on the suit while considering rotational symmetry (Step S5). Some clusters are rejected at this stage because the clusters are too small to acquire matching, or include an invalid dot that cannot be recognized.

Subsequently, the terminal device 10 assigns a unique number to be identified on the suit to each dot of the formed cluster (Step S6). That is, the number is a numerical identifier.

Subsequently, the terminal device 10 determines the size pattern based on analysis of the honeycomb structure described above, and applies a measurement algorithm corresponding to the determined size pattern among measurement algorithms for the respective size patterns (Step S7).

Subsequently, the terminal device 10 specifies the silhouette of the body shape of the user U wearing the new model body suit ZS based on the applied measurement algorithm (Step S8). In the present embodiment, the terminal device 10 acquires a set of pixel coordinates of each of the detected dots and a corresponding numerical identifier. The acquired data is then input to the 3D fitting algorithm as the basic input data required for fitting of the 3D body model. The terminal device 10 processes each photograph to specify the silhouette of a person in the image based on the used algorithm in addition to the positions of the dots.

Subsequently, the terminal device 10 generates the 3D model based on the specified silhouette (Step S9). The terminal device 10 displays the generated 3D model on the screen for the user U. The terminal device 10 also calculates the measurement values (a hip size, a waist size, lengths of legs, and the like) of the body of the user U from the generated 3D model, and displays the measurement values for the user U as a measurement result.

The terminal device 10 may upload the generated 3D model to the information providing device 100. The pieces of processing at Steps S2 to S9 described above may be performed by the information providing device 100 at an optional stage. That is, in the above description about Steps S2 to S9, the terminal device 10 may also be read as the information providing device 100.

2. Configuration Example of Terminal Device

Figure 4:
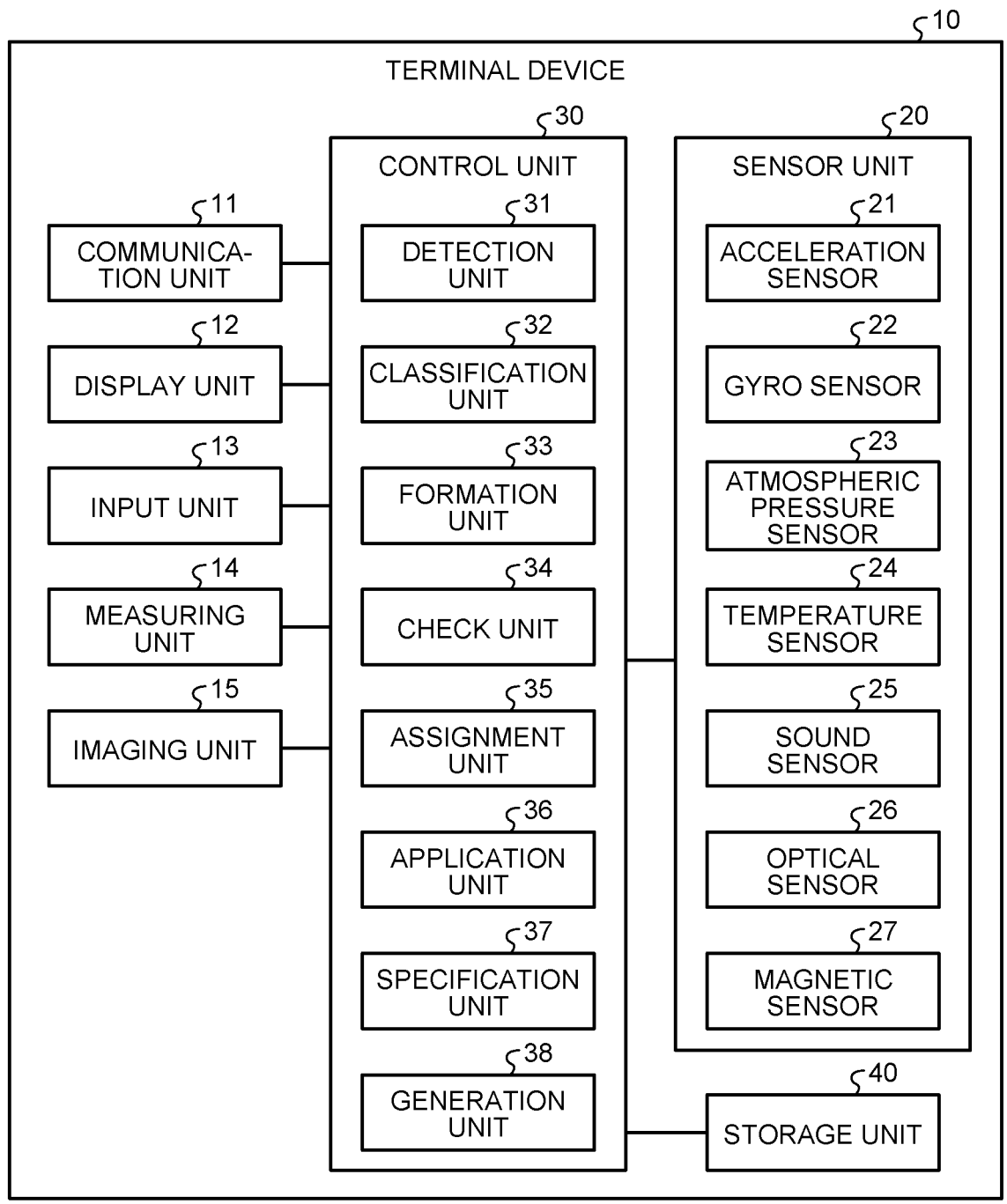
FIG. 4 is a diagram illustrating a configuration example of a terminal device according to the embodiment.

Next, the following describes a configuration of the terminal device 10 with reference to FIG. 4. FIG. 4 is a diagram illustrating the configuration example of the terminal device 10. As illustrated in FIG. 4, the terminal device 10 includes a communication unit 11, a display unit 12, an input unit 13, a measuring unit 14, an imaging unit 15, a sensor unit 20, a control unit 30 (controller), and a storage unit 40.

Communication Unit 11

The communication unit 11 is connected to the network N (refer to FIG. 3) in a wired or wireless manner, and transmits/receives information to/from the information providing device 100 via the network N. For example, the communication unit 11 is implemented by a Network Interface Card (NIC), an antenna, and the like.

Display Unit 12

The display unit 12 is a display device that displays various kinds of information such as positional information. For example, the display unit 12 is a liquid crystal display (LCD) or an organic electro-luminescent display (organic EL display). The display unit 12 is a touch panel display, but is not limited thereto.

Input Unit 13

The input unit 13 is an input device that receives various operations from the user U. For example, the input unit 13 includes a button and the like for inputting a character, a numeral, and the like. In a case in which the display unit 12 is a touch panel display, part of the display unit 12 functions as the input unit 13. The input unit 13 may also be a microphone or the like that receives a voice input from the user U. The microphone may be wireless.

Measuring Unit 14

The measuring unit 14 receives signals (radio waves) sent from a satellite of a Global Positioning System (GPS), and acquires positional information (for example, latitude and longitude) indicating a present position of the terminal device 10 as a host device based on the received signals. That is, the measuring unit 14 measures the position of the terminal device 10. The GPS is merely an example of a Global Navigation Satellite System (GNSS).

The measuring unit 14 can also measure the position by using various methods in addition to the GPS. For example, the measuring unit 14 may measure the position by using various communication functions of the terminal device 10 as an auxiliary measuring unit for position correction and the like.

Imaging Unit 15

The imaging unit 15 is an image sensor (camera) that photographs the user U wearing the new model body suit ZS. For example, the imaging unit 15 is a CMOS image sensor, a CCD image sensor, and the like. The imaging unit 15 is not limited to a built-in camera, and may be a wireless camera capable of communicating with the terminal device 10, or an external camera such as a Web camera.

Sensor Unit 20

The sensor unit 20 includes various sensors that are mounted on or connected to the terminal device 10. Connection can be wired connection or wireless connection. For example, each of the sensors may be a detection device other than the terminal device 10 such as a wearable device or a wireless device. In the example illustrated in FIG. 4, the sensor unit 20 includes an acceleration sensor 21, a gyro sensor 22, an atmospheric pressure sensor 23, a temperature sensor 24, a sound sensor 25, an optical sensor 26, and a magnetic sensor 27.

The sensors 21 to 27 described above are merely examples, and the embodiment is not limited thereto. That is, the sensor unit 20 may have a configuration including part of the sensors 21 to 27, or may include other sensors such as a humidity sensor in addition to or in place of the sensors 21 to 27.

The acceleration sensor 21 is, for example, a triaxial acceleration sensor, and detects physical motion of the terminal device 10 such as a moving direction, a speed, and acceleration of the terminal device 10. The gyro sensor 22 detects physical motion of the terminal device 10 such as inclination in a triaxial direction based on an angular speed and the like of the terminal device 10. The atmospheric pressure sensor 23 detects an atmospheric pressure around the terminal device 10, for example.

The terminal device 10 includes the acceleration sensor 21, the gyro sensor 22, the atmospheric pressure sensor 23, and the like as described above, so that the position of the terminal device 10 can be measured by using a technique such as Pedestrian Dead-Reckoning (PDR) using the sensors 21 to 23 and the like. Thus, it is possible to acquire indoor positional information that is difficult to be acquired by a positioning system such as the GPS.

For example, the number of steps, a walking speed, and a walking distance can be calculated by a pedometer using the acceleration sensor 21. The gyro sensor 22 can be used to find a traveling direction, a direction of a line of sight, and inclination of the body of the user U. Based on the atmospheric pressure detected by the atmospheric pressure sensor 23, it is possible to find an altitude or a number of a floor where the terminal device 10 of the user U is present.

The temperature sensor 24 detects a temperature around the terminal device 10, for example. The sound sensor 25 detects sound around the terminal device 10, for example. The optical sensor 26 detects illuminance around the terminal device 10. The magnetic sensor 27 detects terrestrial magnetism around the terminal device 10, for example.

Each of the atmospheric pressure sensor 23, the temperature sensor 24, the sound sensor 25, the optical sensor 26, and the imaging unit 15 described above can detect an atmospheric pressure, a temperature, sound, or illuminance, or take a surrounding image to detect an environment, a situation, and the like around the terminal device 10. Additionally, based on the environment, the situation, and the like around the terminal device 10, accuracy of the positional information of the terminal device 10 can be improved.

Control Unit 30

For example, the control unit 30 includes a microcomputer including a central processing unit (CPU), a read only memory (ROM), a RAM, an input/output port, and the like, and various circuits. For example, the control unit 30 may be configured by hardware such as an integrated circuit such as an application specific integrated circuit (ASIC) or a field programmable gate array (FPGA).

The control unit 30 controls the whole terminal device 10 including the display unit 12 and the like. For example, the control unit 30 can transmit various kinds of information stored in the storage unit 40 via the communication unit 11, or can output received various kinds of information to be displayed on the display unit 12. The control unit 30 starts the application to implement various functions. For example, the control unit 30 starts the application to implement functions of a detection unit 31, a classification unit 32, a formation unit 33, a check unit 34, an assignment unit 35, an application unit 36, a specification unit 37, and a generation unit 38 described later.

The control unit 30 includes the detection unit 31, the classification unit 32, the formation unit 33, the check unit 34, the assignment unit 35, the application unit 36, the specification unit 37, and the generation unit 38.

The detection unit 31 detects, when the whole body of the user U wearing the new model body suit ZS is photographed by the imaging unit 15, the dots (the new model markers M1 and M2 of the new model body suit ZS) as the measurement markers that expand and contract together with the new model body suit ZS from the photographed image.

The solid dots and the hollow dots are printed, as the dots, on the whole new model body suit ZS. To specify the scale size, a predetermined number of non-stretch fixed markers (reference markers RM) are disposed at fixed points as predetermined positions on the new model body suit ZS separately from the dots. The predetermined positions and number are positions and the number where the fixed marker is necessarily included at the time of photographing the whole new model body suit ZS at respective viewing angles. For example, the predetermined positions are positions corresponding to the chest, the back, and the feet of the new model body suit ZS. The predetermined number is equal to or larger than four. The stretch material area is disposed around the fixed marker separately from the dots.

The classification unit 32 classifies each of the dots of the new model body suit ZS into any of solid, hollow, and unknown. That is, the classification unit 32 classifies each of the new model markers M1 and M2 of the new model body suit ZS included in the photographed image into any of solid, hollow, and unknown.

The formation unit 33 analyzes the relative positions of the dots as the measurement markers that expand and contract together with the new model body suit ZS, and forms the cluster of the dots. For example, the formation unit 33 forms the hexagonal cluster from the dot pattern of the new model body suit ZS, and increases the hexagonal cluster to form the unique honeycomb structure.

The check unit 34 checks whether the random pattern of the dots of the formed cluster matches the known random pattern.

The assignment unit 35 assigns numbers to the clusters and the dots based on the honeycomb structure. For example, the assignment unit 35 assigns a unique number to be identified on the suit to each dot of the formed cluster.

The application unit 36 determines, based on the formed cluster, the size pattern of the new model body suit ZS for which a plurality of the size patterns are prepared, and applies the measurement algorithm corresponding to the determined size pattern among the measurement algorithms provided for the respective size patterns.

The specification unit 37 acquires the assigned number, sets the assigned number to a predetermined coordinate position, and specifies the silhouette.

The generation unit 38 generates the 3D model based on the cluster. Specifically, the generation unit 38 generates the 3D model based on the specified silhouette.

Storage Unit 40

The storage unit 40 is, for example, implemented by a semiconductor memory element such as a random access memory (RAM) and a flash memory, or a storage device such as a hard disk drive (HDD), a Solid State Drive (SSD), and an optical disc. The storage unit 40 stores various computer programs, various kinds of data, and the like.

In the present embodiment, the storage unit 40 stores the application for measuring body sizes. The storage unit 40 also stores the numbers assigned to the respective dots. The storage unit 40 also stores the known pseudo-random pattern for checking the random pattern. The storage unit 40 also stores the measurement algorithms for the respective size patterns. The storage unit 40 also stores the measurement values (a waistline, a hip line, and the like) of the body of the user U wearing the new model body suit ZS, and the generated 3D body model. Furthermore, the storage unit 40 stores data used for the processing according to the embodiment, data obtained as a result of the processing, and the like in addition to the data described above.

3. Processing Procedure

Figure 5:
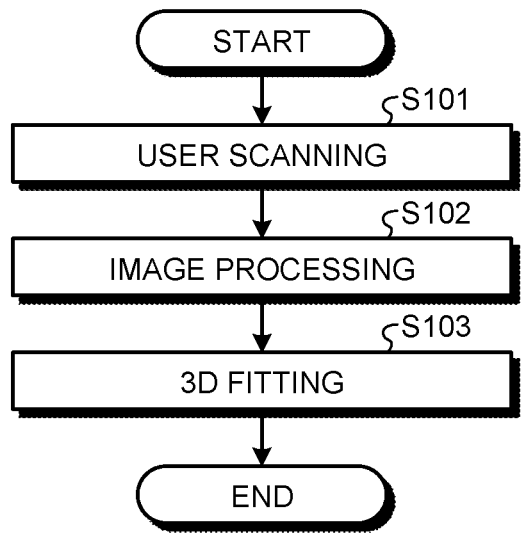
FIG. 5 is a flowchart illustrating a processing procedure according to the embodiment.

Next, the following describes a processing procedure performed by the terminal device 10 according to the embodiment with reference to FIG. 5. FIG. 5 is a flowchart illustrating the processing procedure according to the embodiment. The processing procedure described below is repeatedly performed by the control unit 30 of the terminal device 10.

As illustrated in FIG. 5, the control unit 30 of the terminal device 10 scans the whole body of the user U wearing the new model body suit ZS using the imaging unit 15 (Step S101). The new model body suit ZS (suit) is a stretch tight body suit that is manufactured by using a standard garment printing technique (digital sublimation printing) with low cost. The suit covers the whole body (except a face and a head), and is comprised of two parts including leggings and a top. In the present embodiment, the control unit 30 provides a tutorial, a design drawing, an interactive check, and voice guidance for checking that the user U wears the suit properly, and guiding the user U to an optimum standing position before starting scanning. In the "default" mode for scanning the user U, the control unit 30 guides the user U to rotate his/her body at various angles, the user U standing in front of the rear camera of the terminal device 10 that is placed on the stand made of corrugated cardboard placed on a flat desk. The guidance is voice guidance by voice output. The guidance may also be guidance using screen display on the terminal or an optical device. The user U maintains a consistent pose of his/her body throughout the whole scanning, and stops moving while each photograph is being taken. The control unit 30 then takes twelve photographs at various angles by using the imaging unit 15.

Subsequently, the control unit 30 of the terminal device 10 performs image processing on the photograph of the whole body of the user U taken by scanning (Step S102). In the present embodiment, the control unit 30 assumes the photograph (image) of the user U wearing the suit taken at various angles as basic input data, and detects and recognizes the dot pattern covering the suit to detect a person in the image. The control unit 30 may also detect a face or eyes in the photographed image. The suit includes a dot design pattern covering almost the whole portion of the surface, and the dots are placed as dense regular hexagons (honeycomb shape). That is, the control unit 30 performs the image processing to recognize the small circular/elliptical "blobs" that may be the dots of the suit (the new model markers M1 and M2 of the new model body suit ZS). Each of the dots is any one of "solid" and "hollow", and is selected by using the pseudo-random algorithm. Substantially the same number of solid dots and hollow dots are printed on the whole suit. The control unit 30 estimates a portion of the suit that is being seen by analyzing the dot pattern of an optional portion of the suit. In addition to the positions of the dots, the control unit 30 specifies the silhouette (outline) of a person in the image by processing each photograph.

Subsequently, the control unit 30 of the terminal device 10 performs 3D fitting based on the positions of the dots and the silhouette detected in each image frame (Step S103). In the present embodiment, the control unit 30 calculates a set of body model parameters accurately fitting to the positions of the dots and the silhouette detected in each image frame, and relative camera poses using the 3D fitting algorithm. Specifically, the control unit 30 estimates the 3D model of the body shape of the user U, the positions of the respective dots of the body of the user U, the position and orientation of the camera with respect to the body of the user U, and the pose of the body reflected in each image at the same time. At this point, the control unit 30 minimizes the pixel distance between the estimated position and the observed position of each dot of the image while using the repetition procedure and adjusting all of the parameters (starting from the first estimation). In a case in which the silhouette is detected in one or a plurality of the image frames, the silhouette is also minimized.

3-1. Image Processing Procedure

Figure 6:
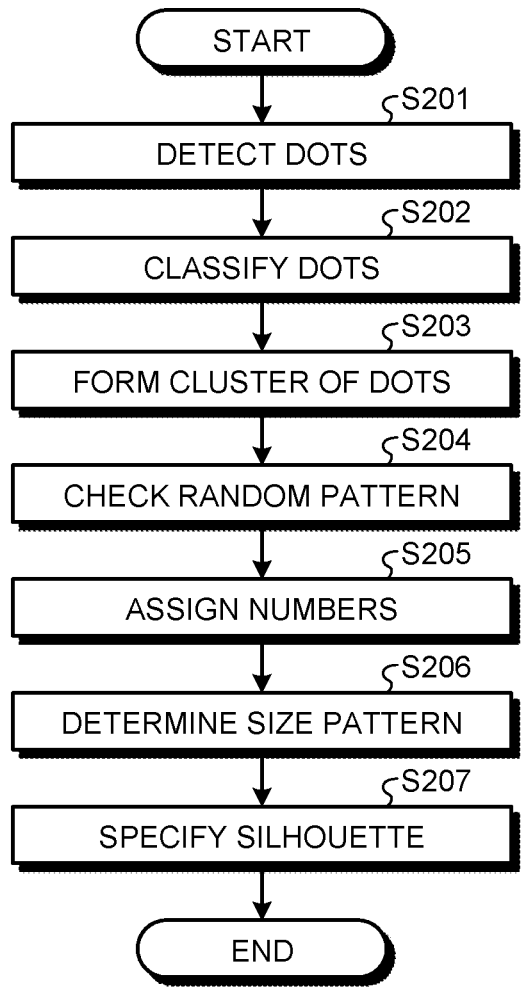
FIG. 6 is a flowchart illustrating an image processing procedure according to the embodiment.

The following describes an image processing procedure according to the embodiment with reference to FIG. 6. FIG. 6 is a flowchart illustrating the image processing procedure according to the embodiment. The processing procedure described below is repeatedly performed by the control unit 30 of the terminal device 10.

As illustrated in FIG. 6, the detection unit 31 of the terminal device 10 detects, when the whole body of the user U wearing the new model body suit ZS is photographed by the imaging unit 15, the dots (new model markers M1 and M2 of the new model body suit ZS) as the measurement markers that expand and contract together with the new model body suit ZS from the photographed image (Step S201).

Subsequently, the classification unit 32 of the terminal device 10 classifies each of the dots of the new model body suit ZS into any of solid, hollow, and unknown (Step S202). For example, the classification unit 32 classifies each of the new model markers M1 and M2 of the new model body suit ZS included in the photographed image into any of solid, hollow, and unknown.

Subsequently, the formation unit 33 of the terminal device 10 analyzes the relative positions of the dots as the measurement markers that expand and contract together with the new model body suit ZS, and forms the cluster of the dots (Step S203). For example, the formation unit 33 analyzes the relative positions of the dots detected in the vicinity of each local image, and forms the cluster of the dots to be adapted to the expected honeycomb (regular hexagonal) pattern.

Subsequently, the check unit 34 of the terminal device 10 checks whether the random pattern of the dots of the formed cluster matches the known random pattern (Step S204). For example, the check unit 34 checks whether each of the formed clusters matches the known pseudo-random pattern used for printing of the suit while considering rotational symmetry. Some clusters are rejected at this stage because the clusters are too small to acquire matching, or include an invalid dot that cannot be recognized.

Subsequently, the assignment unit 35 of the terminal device 10 assigns a unique number to be identified on the suit to each of the dots of the formed cluster (Step S205). For example, the assignment unit 35 assigns a unique number to be identified on the suit to each dot of remaining clusters that are not rejected by the check unit 34.

Subsequently, the application unit 36 of the terminal device 10 determines, based on the formed cluster, the size pattern of the new model body suit ZS for which a plurality of the size patterns are prepared, and applies the measurement algorithm corresponding to the determined size pattern among the measurement algorithms provided for the respective size patterns (Step S206).

Subsequently, the specification unit 37 of the terminal device 10 acquires the assigned number, sets the assigned number to the predetermined coordinate position, and specifies the silhouette (Step S207). For example, the specification unit 37 acquires a set of pixel coordinates of each of the detected dots and a corresponding numerical identifier, and specifies the silhouette based on the set of pixel coordinates of each dot and the corresponding numerical identifier.

3-2. 3D Fitting Processing Procedure

Figure 7:
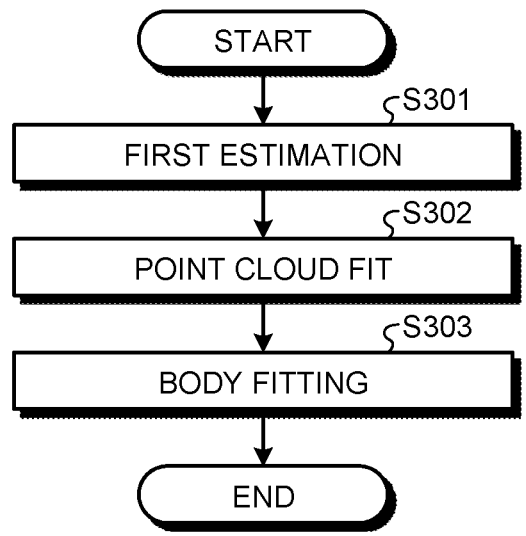
FIG. 7 is a flowchart illustrating a 3D fitting processing procedure according to the embodiment.

The following describes a 3D fitting processing procedure according to the embodiment with reference to FIG. 7. FIG. 7 is a flowchart illustrating the 3D fitting processing procedure according to the embodiment. The processing procedure described below is repeatedly performed by the control unit 30 of the terminal device 10.

As illustrated in FIG. 7, the generation unit 38 of the terminal device 10 performs the first estimation as a first fitting process of the 3D fitting algorithm (Step S301). For example, the generation unit 38 assumes "default" positions of the respective dots of the body starting from an average body shape, and detects a set of relative camera poses matching the detected image data by the fitting algorithm. This process is repeated to be converged. At this point, to accelerate convergence, the generation unit 38 inputs additional information (if it is usable) to the algorithm, the additional information including distinction of sex of the user U, a height, a body weight, a pose of the user U (selected from corresponding poses), and the like.

Subsequently, the generation unit 38 of the terminal device 10 performs point cloud fit as a second fitting process of the 3D fitting algorithm (Step S302). For example, the generation unit 38 repeatedly adjusts estimated values of the 3D positions of the respective dots and the camera poses starting from the first estimation described above to improve matching with the positions of the dots detected in each image frame (bundle adjustment). Next, the generation unit 38 optimizes the parameters of the parametric body model (SMPL), and minimizes a distance from the respective 3D dot positions to the surface of the mesh to perform initial fit of the 3D body model.

Subsequently, the generation unit 38 of the terminal device 10 performs body fitting as a third fitting process of the 3D fitting algorithm (Step S303). For example, the generation unit 38 further adjusts the parameters of the parametric body model (SMPL), and minimizes the distance between the estimated dot position and the observed dot position in each image. In a case in which variation is caused in the method of wearing the suit, the dot may be displayed at an unexpected place of the body when the fabric is locally twisted or stretched, thus the dot is moved on the surface of the body as needed. The silhouette data is included in the fitting process at this stage. The fitting process is repetitive, and follows the processing strategy of "from coarse things to fine things". In this strategy, a subset of the most important model parameters is estimated first, and additional parameters are introduced as the algorithm proceeds. At the last step of fitting, a "dynamic" change of the model, that is, movement of hands and feet between the image frames is enabled.

4. Modification

The terminal device 10 and the information providing device 100 described above may be implemented in various different forms other than the embodiment described above. The following describes a modification of the embodiment.

In the embodiment described above, the color of the dots (new model markers M1 and M2 of the new model body suit ZS) and the background color are allowed to be flexibly selected. For example, various design variations are allowed such that a square or a hexagon is used instead of the circular dot, or a color is used for distinguishing between a plurality of types of dots or other geometric designs. The same applies to the shape and the color of the hollow, not limited to the dot main body. The same also applies to selection of the color of the fixed marker (reference marker RM) and the background color. In the embodiment described above, exemplified are the new model markers M1 and M2 each having a size of 6 mm, but actually, the dot, the hollow, and the fixed marker may have an optional size.

Part of or the whole processing performed by the terminal device 10 in the embodiment described above may be actually performed by the information providing device 100. For example, the processing may be completed on the server (the information providing device 100 side). In this case, the information providing device 100 is assumed to have the function of the terminal device 10 in the embodiment described above.

5. Effect

As described above, the terminal device 10 according to the present application includes the formation unit 33 that analyzes the relative positions of the dots (new model markers M1 and M2) as the measurement markers that expand and contract together with the suit (new model body suit ZS) to form the cluster of the dots, and the generation unit 38 that generates the 3D model based on the cluster.

The terminal device 10 according to the present application further includes the assignment unit 35 that assigns numbers to the clusters and the dots, and the specification unit 37 that acquires the assigned number, sets the assigned number to the predetermined coordinate position, and specifies the silhouette. The generation unit 38 generates the 3D model based on the specified silhouette.

The formation unit 33 forms the hexagonal cluster from the dot pattern of the suit, and increases the hexagonal cluster to form the unique honeycomb structure. The assignment unit 35 assigns numbers to the clusters and the dots based on the honeycomb structure.

The solid dots and the hollow dots are printed as the dots on the whole suit.

The terminal device 10 according to the present application further includes the classification unit 32 that classifies each of the dots of the suit into any of solid, hollow and unknown, and the check unit 34 that checks whether the random pattern of the dots of the formed cluster matches the known random pattern.

The predetermined number of non-stretch fixed markers (reference markers RM) are disposed at the fixed points as the predetermined positions on the suit separately from the dots to specify the scale size.

The predetermined positions and number are positions and a number where the fixed marker is necessarily included at the time of photographing the whole suit at the respective viewing angles.

The predetermined positions are positions corresponding to the chest, the back, and the feet of the suit. The predetermined number is equal to or larger than four.

The stretch material area is disposed around the fixed marker separately from the dots.

The terminal device 10 according to the present application further includes the application unit 36 that determines, based on the cluster, the size pattern of the suit for which a plurality of the size patterns are prepared at the time of photographing the suit, and applies the measurement algorithm corresponding to the determined size pattern among the measurement algorithms provided for the respective size patterns.

With any of or a combination of the pieces of processing described above, the 3D model of the body shape of the user can be created with higher accuracy by using the garment for measuring body sizes.

6. Hardware Configuration

Figure 8:
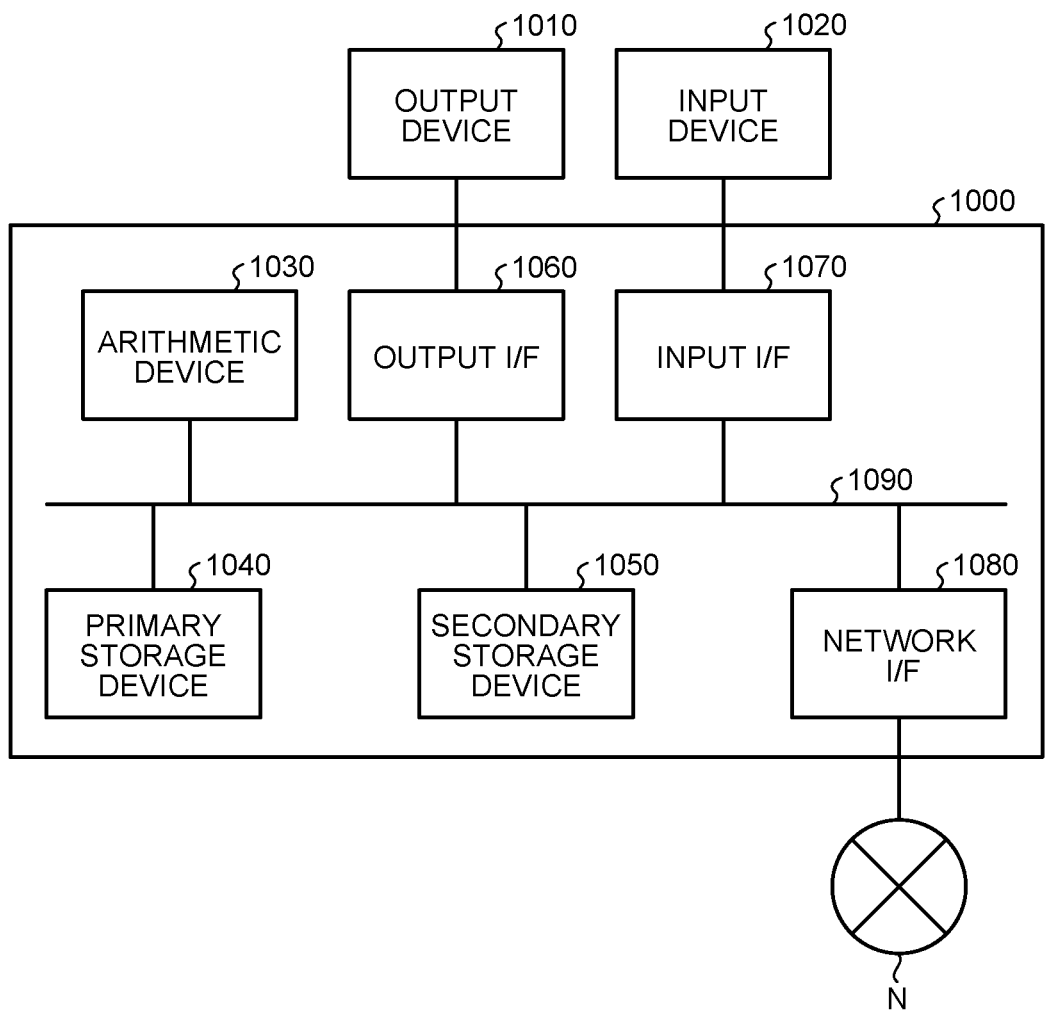
FIG. 8 is a diagram illustrating an example of a hardware configuration.

The terminal device 10 and the information providing device 100 according to the embodiment described above are implemented by a computer 1000 having a configuration as illustrated in FIG. 8, for example. The following describes the terminal device 10 as an example. FIG. 8 is a diagram illustrating an example of the hardware configuration. The computer 1000 is connected to an output device 1010 and an input device 1020, and has a form in which an arithmetic device 1030, a primary storage device 1040, a secondary storage device 1050, an output interface (I/F) 1060, an input I/F 1070, and a network I/F 1080 are connected to each other via a bus 1090.

The arithmetic device 1030 operates based on a computer program stored in the primary storage device 1040 or the secondary storage device 1050, a computer program read out from the input device 1020, and the like, and performs various kinds of processing. The arithmetic device 1030 is implemented by a central processing unit (CPU), a micro processing unit (MPU), an application specific integrated circuit (ASIC), or a field programmable gate array (FPGA), for example.

The primary storage device 1040 is a memory device such as a random access memory (RAM) that temporarily stores data used by the arithmetic device 1030 for various arithmetic operations. The secondary storage device 1050 is a storage device in which data used for various arithmetic operations by the arithmetic device 1030 and various databases are registered, and is implemented by a read only memory (ROM), a hard disk drive (HDD), a Solid State Drive (SSD), a flash memory, and the like. The secondary storage device 1050 may be a built-in storage, or an external storage. The secondary storage device 1050 may also be a removable storage medium such as a USB memory or a Secure Digital (SD) memory card. The secondary storage device 1050 may also be a cloud storage (online storage), a Network Attached Storage (NAS), a file server, or the like.

The output I/F 1060 is an interface for transmitting information to be output to the output device 1010 that outputs various kinds of information such as a display, a projector, and a printer, and is implemented by a connector meeting a standard such as Universal Serial Bus (USB), Digital Visual Interface (DVI), and High Definition Multimedia Interface (HDMI) (registered trademark), for example. The input I/F 1070 is an interface for receiving information from various kinds of the input devices 1020 such as a mouse, a keyboard, a keypad, a button, and a scanner, and is implemented by USB, for example.

The output I/F 1060 and the input I/F 1070 may be respectively connected to the output device 1010 and the input device 1020 in a wireless manner. That is, the output device 1010 and the input device 1020 may be wireless appliances.

The output device 1010 and the input device 1020 may also be integrated with each other like a touch panel. In this case, the output I/F 1060 and the input I/F 1070 may also be integrated with each other as an input/output I/F.

The input device 1020 may be, for example, a device that reads out information from an optical recording medium such as a Compact Disc (CD), a Digital Versatile Disc (DVD), and a Phase change rewritable Disk (PD), a Magneto-Optical recording medium such as a Magneto-Optical disk (MO), a tape medium, a magnetic recording medium, or a semiconductor memory.

The network I/F 1080 receives data from another appliance via the network N and transmits the data to the arithmetic device 1030, and transmits the data generated by the arithmetic device 1030 to another appliance via the network N.

The arithmetic device 1030 controls the output device 1010 and the input device 1020 via the output I/F 1060 and the input I/F 1070. For example, the arithmetic device 1030 loads a computer program from the input device 1020 or the secondary storage device 1050 onto the primary storage device 1040, and executes the loaded computer program.

For example, in a case in which the computer 1000 functions as the terminal device 10, the arithmetic device 1030 of the computer 1000 executes a computer program loaded onto the primary storage device 1040 to implement the function of the control unit 30. The arithmetic device 1030 of the computer 1000 may also load a computer program acquired from another appliance via the network I/F 1080 onto the primary storage device 1040, and execute the loaded computer program. The arithmetic device 1030 of the computer 1000 may also cooperate with another appliance via the network I/F 1080, and call a function of a computer program, data, and the like to be used from another computer program of another appliance.

7. Others

The embodiment of the present application has been described above, but the present invention is not limited to the content of the embodiment. The constituent elements described above include an element that is easily conceivable by those skilled in the art, substantially the same element, and what is called an equivalent. The constituent elements described above can also be appropriately combined with each other. In addition, the constituent elements can be variously omitted, replaced, or modified without departing from the gist of the embodiment described above.

Among the pieces of processing described above in the embodiment, all or part of the pieces of processing described to be automatically performed can be manually performed, or all or part of the pieces of processing described to be manually performed can be automatically performed using a known method. Additionally, the processing procedures, the specific names, and the information including various kinds of data or parameters described herein or illustrated in the drawings can be optionally changed unless otherwise specifically noted. For example, various kinds of information illustrated in the drawings are not limited to the illustrated information.

The constituent elements of the devices illustrated in the drawings are merely conceptual, and it is not required that they are physically configured as illustrated necessarily. That is, specific forms of distribution and integration of the devices are not limited to those illustrated in the drawings. All or part thereof may be functionally or physically distributed/integrated in arbitrary units depending on various loads or usage states.

For example, the information providing device 100 described above may be implemented by a plurality of server computers, or may be implemented by calling an external platform and the like by an Application Programming Interface (API), network computing, and the like depending on a function. The configuration can be flexibly changed.

The embodiment and the modification described above can be appropriately combined with each other in a range of not causing contradiction between the pieces of processing content.

The "section", "module", and "unit" described above can also be read as a "means", a "circuit", and the like. For example, the acquisition unit can be read as an acquisition unit or an acquisition circuit.

REFERENCE SIGNS LIST

1 INFORMATION PROCESSING SYSTEM
10 TERMINAL DEVICE
11 COMMUNICATION UNIT
15 IMAGING UNIT
30 CONTROL UNIT
31 DETECTION UNIT
32 CLASSIFICATION UNIT
33 FORMATION UNIT
34 CHECK UNIT
35 ASSIGNMENT UNIT
36 APPLICATION UNIT
37 SPECIFICATION UNIT
38 GENERATION UNIT
40 STORAGE UNIT
100 INFORMATION PROVIDING DEVICE
ZS NEW MODEL BODY SUIT
M1, M2 NEW MODEL MARKER
RM REFERENCE MARKER

The invention claimed is:

1. An information processing device comprising:
an imaging unit configured to photograph a user wearing a suit having a dot pattern covering a surface of the suit where dots are arranged;
a detection unit configured to detect the dots as measurement markers that expand and contract together with the suit from the photographed image;
a formation unit configured to analyze relative positions of the dots and form a predetermined polygonal cluster from the dot pattern of the suit, and increase the polygonal cluster to form a unique cluster structure;
a specification unit configured to specify a silhouette based on the formed cluster structure; and
a generation unit configured to generate a three-dimensional (3D) model based on the specified silhouette.

2. The information processing device according to claim 1, further comprising:
an assignment unit configured to assign numbers to the polygonal cluster and the dots, wherein the specification unit acquires the assigned number, sets the assigned number to a predetermined coordinate position, and specifies the silhouette, and the generation unit generates the 3D model based on the specified silhouette.

3. The information processing device according to claim 2, wherein the formation unit forms a hexagonal cluster as the polygonal cluster from the dot pattern of the suit, and increases the hexagonal cluster to form a unique honeycomb structure, and the assignment unit assigns numbers to the hexagonal cluster and the dots based on the honeycomb structure.

4. The information processing device according to claim 1, wherein solid dots and hollow dots are printed as the dots on the whole suit.

5. The information processing device according to claim 4, further comprising:

a classification unit configured to classify each of the dots of the suit into any of solid, hollow, and unknown; and a check unit configured to classify each of the dots into a predetermined dot by checking whether the formed cluster matches the dot pattern used for printing the dots on the suit.

6. The information processing device according to claim 1, wherein a predetermined number of non-stretch fixed markers are disposed at fixed points at predetermined positions on the suit separately from the dots to specify a scale size.

7. The information processing device according to claim 6, wherein the imaging unit photographs the user wearing the suit from different viewing angles; and the predetermined positions and number are positions and a number where the fixed marker is necessarily included at the time of photographing the whole suit at respective viewing angles.

8. The information processing device according to claim 6, wherein the predetermined positions are positions corresponding to a chest, a back, and feet of the suit, and the predetermined number is equal to or larger than four.

9. The information processing device according to claim 6, wherein a stretch material area is disposed around the fixed marker separately from the dots.

10. The information processing device according to claim 1, further comprising:

an application unit configured to determine a size pattern of the suit for which a plurality of the size patterns are prepared based on analysis of the polygonal cluster at the time of photographing the suit, and apply a measurement algorithm corresponding to the determined size pattern among measurement algorithms provided for the respective size patterns.

11. An information processing method performed by an information processing device, the information processing method comprising:

photographing a user wearing a suit having a dot pattern covering a surface of the suit wherein dots are arranged, by a camera mounted on the information processing device;

detecting the dots as measurement markers that expand and contract together with the suit from the photographed image;

analyzing relative positions of the dots and forming a predetermined polygonal cluster from the dot pattern, and increasing the polygonal cluster to form a unique cluster structure;

specifying a silhouette based on the formed cluster structure; and generating a three-dimensional (3D) model based on the specified silhouette.

* * * * *